United States Patent
Maas

(10) Patent No.: US 11,320,614 B2
(45) Date of Patent: May 3, 2022

(54) FIBER OPTIC SENSOR AND SYSTEM INCLUDING A FIBER OF AN OPTICAL CABLE AS A SENSOR FIBER

(71) Applicant: GEOSPACE TECHNOLOGIES CORPORATION, Houston, TX (US)

(72) Inventor: Steven James Maas, Austin, TX (US)

(73) Assignee: Geospace Technologies Corporation, Houston, TX (US)

( * ) Notice: Subject to any disclaimer, the term of this patent is extended or adjusted under 35 U.S.C. 154(b) by 0 days.

(21) Appl. No.: 16/554,297

(22) Filed: Aug. 28, 2019

(65) Prior Publication Data

US 2020/0073069 A1    Mar. 5, 2020

Related U.S. Application Data

(60) Provisional application No. 62/723,903, filed on Aug. 28, 2018.

(51) Int. Cl.
| | |
|---|---|
| G02B 6/44 | (2006.01) |
| G01V 11/00 | (2006.01) |
| G01B 9/02 | (2006.01) |
| G02B 6/293 | (2006.01) |
| G02B 6/42 | (2006.01) |
| G01B 9/021 | (2006.01) |

(52) U.S. Cl.
CPC ........... *G02B 6/4427* (2013.01); *G01B 9/021* (2013.01); *G02B 6/29349* (2013.01); *G02B 6/29359* (2013.01); *G02B 6/4212* (2013.01)

(58) Field of Classification Search
CPC ..... H01R 13/523; G02B 6/4475; G01V 1/226
See application file for complete search history.

(56) References Cited

U.S. PATENT DOCUMENTS

| | | | | |
|---|---|---|---|---|
| 6,591,025 | B1 * | 7/2003 | Siems | G01H 3/005 |
| | | | | 385/12 |
| 7,502,120 | B2 * | 3/2009 | Menezo | G01D 5/266 |
| | | | | 356/478 |
| 2004/0067002 | A1 * | 4/2004 | Berg | G01V 11/00 |
| | | | | 385/12 |
| 2005/0077455 | A1 * | 4/2005 | Townley-Smith | G08B 13/124 |
| | | | | 250/227.27 |
| 2005/0265121 | A1 * | 12/2005 | Scott | H01R 13/523 |
| | | | | 367/20 |
| 2007/0103692 | A1 * | 5/2007 | Hall | G01B 9/02083 |
| | | | | 356/478 |
| 2008/0112264 | A1 | 5/2008 | Ronnekleiv et al. | |
| 2008/0144992 | A1 * | 6/2008 | Thompson | G01D 5/35345 |
| | | | | 385/13 |
| 2015/0043310 | A1 | 2/2015 | Maas et al. | |

OTHER PUBLICATIONS

International Search Report dated Nov. 14, 2019 in counterpart International Application No. PCT/US2019/075611.

* cited by examiner

*Primary Examiner* — Eric Wong
(74) *Attorney, Agent, or Firm* — Blank Rome LLP

(57) ABSTRACT

A fiber optic cable includes a plurality of optical fibers and an optical sensor. The optical sensor includes a first optical coupler and a first mirror. The first optical coupler is coupled to a first of the optical fibers and to a second of the optical fibers at a first sensor takeout location. The first mirror is coupled to the first of the optical fibers at a second sensor takeout location. The first sensor takeout location is longitudinally offset from the second sensor takeout location.

15 Claims, 8 Drawing Sheets

FIBER OPTIC SENSOR AND SYSTEM INCLUDING A FIBER OF AN OPTICAL CABLE AS A SENSOR FIBER

CROSS-REFERENCE TO RELATED APPLICATIONS

This application claims priority to U.S. Provisional Application No. 62/723,903, filed Aug. 28, 2018, entitled "Fiber Optic Sensor and System Including a Fiber of an Optical Cable as a Sensor Fiber," which is incorporated herein by reference in its entirety.

BACKGROUND

Optical fibers are used in various applications for communicating data and for sensing environmental conditions, such as temperature or stress. In seismic data acquisition systems fiber of optic sensor are used to sense parameters of seismic energy such as acceleration, motion and/or pressure. The seismic energy may be naturally occurring or may be imparted by a seismic source for the purpose of performing seismic surveys, for instance, in a land or underwater environment.

SUMMARY

A fiber optic cable that includes an optical sensor and a method for providing the optical sensor are disclosed herein. In one example, a method for providing an optical sensor includes extracting a first optical fiber and a second optical fiber from an optical cable at a first sensor takeout location, and coupling a first optical coupler to the first optical fiber and the second optical fiber at the first sensor takeout location. The method also includes extracting the first optical fiber from the optical cable at a second sensor takeout location, and coupling a first mirror to the first optical fiber at the second sensor takeout location. A method may also include extracting the second optical fiber from the optical cable at a third sensor takeout location, and coupling a second mirror to the second optical fiber at the third sensor takeout location. A method may also include extracting the second optical fiber from the optical cable at the second sensor takeout location, and coupling a second mirror to the second optical fiber at the second sensor takeout location. A method may also include extracting a third optical fiber from the optical cable at the first sensor takeout location, and coupling a second optical coupler to the third optical fiber and a first segment of optical fiber extending from the second optical coupler. A method may also include extracting a fourth optical fiber from the optical cable at the first sensor takeout location, and coupling a third optical coupler to the fourth optical fiber and a second segment of optical fiber extending from the second optical coupler. A method may also include enclosing the first sensor takeout location in a first housing and enclosing the second sensor takeout location in a second housing. The optical sensor may be a Michelson interferometer or a Fabre Perot interferometer. A method may also include forming the Fabre Perot interferometer using optical grating components. The Michelson interferometer may include an in-line Michelson architecture.

In another example, a fiber optic cable includes a plurality of optical fibers and an optical sensor. The optical sensor includes a first optical coupler and a first mirror. The first optical coupler is coupled to a first of the optical fibers and to a second of the optical fibers at a first sensor takeout location. The first mirror is coupled to the first of the optical fibers at a second sensor takeout location. The first sensor takeout location is longitudinally offset from the second sensor takeout location. The optical sensor may also include a second mirror coupled to the second of the optical fibers at a third sensor takeout location. The third sensor takeout location is longitudinally offset from the first sensor takeout location and the second sensor takeout location. The optical sensor may also include a second mirror coupled to the second of the optical fibers at the second sensor takeout location. The fiber optic cable may also include a second optical coupler, at the first sensor takeout location, coupled to a third of the optical fibers and to a first segment of optical fiber extending from the first optical coupler. The fiber optic cable may also include a third optical coupler, at the first sensor takeout location, coupled to a fourth of the optical fibers and to a second segment of optical fiber extending from the first optical coupler. The fiber optic cable may also include a first housing enclosing the first sensor takeout location and a second housing enclosing the second sensor takeout location. The optical sensor may be a Michelson interferometer or a Fabre Perot interferometer. The Fabre Perot interferometer may include optical grating components. The Michelson interferometer may include an in-line Michelson architecture.

In a further example, a seismic data acquisition system includes a fiber optic cable. The fiber optic cable includes a plurality of optical fibers and an optical sensor. The optical sensor includes a first optical coupler, a first mirror, a second mirror, a second optical coupler, a third optical coupler, a first housing, a second housing, and a third housing. The first optical coupler is coupled to a first of the optical fibers and a second of the optical fibers at a first sensor takeout location. The first mirror is coupled to the first of the optical fibers at a second sensor takeout location. The second mirror is coupled to the second of the optical fibers at a third sensor takeout location. The second optical coupler is coupled to a third of the optical fibers and to a first segment of optical fiber extending from the first optical coupler. The third optical coupler is coupled to a fourth of the optical fibers and to a second segment of optical fiber extending from the first optical coupler. The first housing encloses the first sensor takeout location. The second housing encloses the second sensor takeout location. The third housing encloses the third sensor takeout location. The optical sensor may be a Michelson interferometer or a Fabre Perot interferometer. The Fabre Perot interferometer may include optical grating components. The Michelson interferometer may include an in-line Michelson architecture. The seismic data acquisition system may also include a light source coupled to the fiber optic cable and configured to multiplex an output of the optical sensor using Frequency Division Multiplexing (FDM) telemetry. The seismic data acquisition system may also include a light source coupled to the fiber optic cable and configured to multiplex an output of the optical sensor using FDM and Wavelength Division Multiplexing (WDM) telemetry.

BRIEF DESCRIPTION OF THE DRAWINGS

For a detailed description of exemplary embodiments, reference will now be made to the accompanying drawings, in which.

DETAILED DESCRIPTION

It is to be understood the present disclosure is not limited to particular devices or methods, which may, of course, vary. It is also to be understood that the terminology used herein is for the purpose of describing particular embodiments only and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to." The term "coupled" means directly or indirectly connected.

This disclosure is related generally to the field of marine surveying. Marine surveying can include, for example, seismic and/or electromagnetic (EM) surveying, among others. For example, this disclosure may have applications in marine surveying, in which one or more sources are used to generate wave-fields, and receivers—either towed or ocean bottom—receive energy generated by the sources and affected by the interaction with the subsurface formation.

Figure 1:
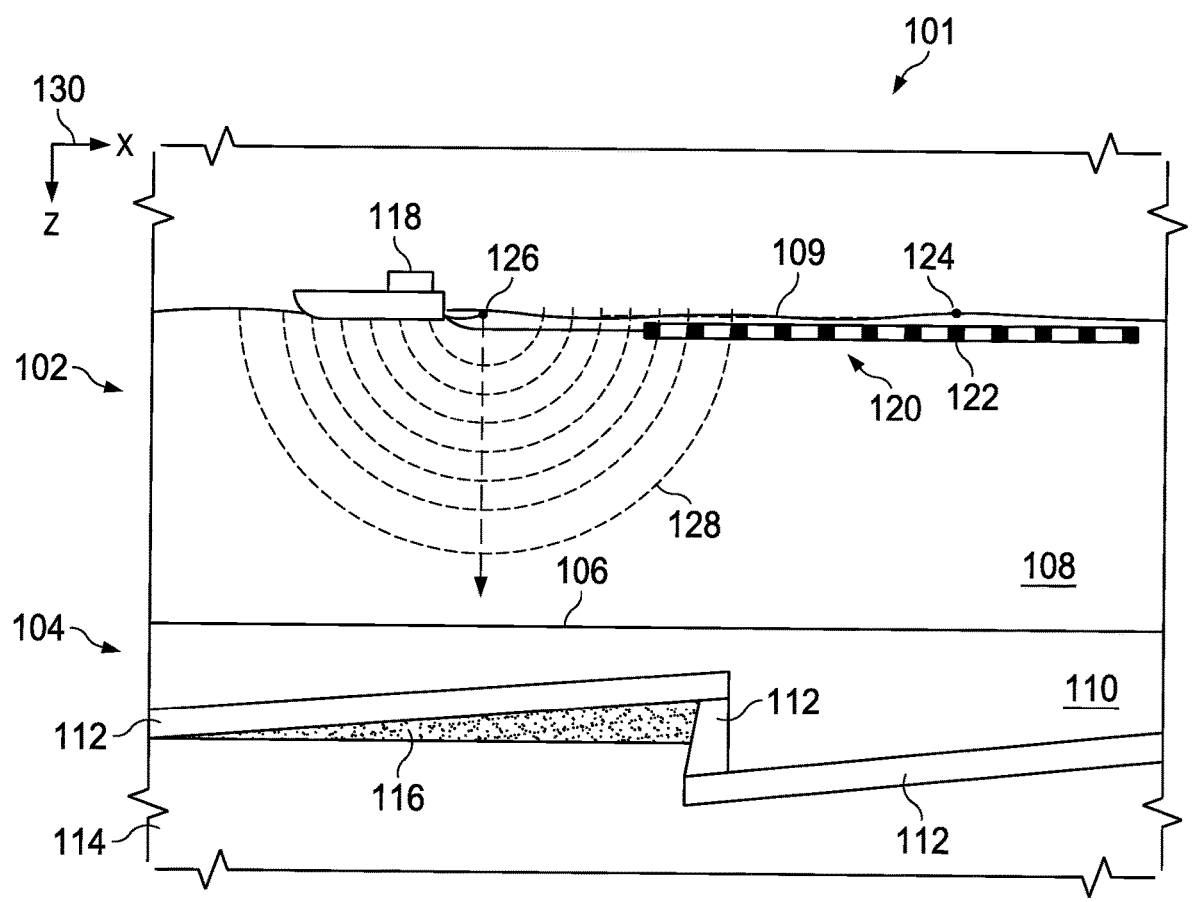
FIG. 1 shows an example seismic data acquisition system for performing a marine seismic survey.

FIG. 1 illustrates an elevation or xz-plane 130 view of an example of marine surveying in which signals are emitted by a seismic source 126 for recording by marine survey receivers 122. The recording can be used for processing and analysis in order to help characterize the structures and distributions of features and materials underlying the surface of the earth. FIG. 1 shows a domain volume 102 of the earth's surface comprising a subsurface volume 104 of sediment and rock below the surface 106 of the earth that, in turn, underlies a fluid volume 108 of water having a sea surface 109 such as in an ocean, an inlet or bay, or a large freshwater lake. The domain volume 102 shown in FIG. 1 represents an example experimental domain for a class of marine surveys. FIG. 1 illustrates a first sediment layer 110, an uplifted rock layer 112, second, underlying rock layer 114, and hydrocarbon-saturated layer 116. One or more elements of the subsurface volume 104, such as the first sediment layer 110 and the first uplifted rock layer 112, can be an overburden for the hydrocarbon-saturated layer 116. In some instances, the overburden may include salt.

FIG. 1 shows an example of a marine survey vessel 118 equipped to carry out marine surveys. In particular, the marine survey vessel 118 can tow one or more streamers 120 (shown as one streamer for ease of illustration) generally located below the sea surface 109. The streamers 120 can be long cables containing power and data-transmission lines (e.g., electrical, optical fiber, etc.) to which marine survey receivers may be coupled. In one type of marine survey, each marine survey receiver, such as the marine survey receiver 122 represented by the shaded disk in FIG. 1, comprises a pair of sensors including a geophone that detects particle displacement within the water by detecting particle motion variation, such as velocities or accelerations, and/or a hydrophone that detects variations in pressure. In one type of marine survey, each marine survey receiver, such as marine survey receiver 122, comprises an electromagnetic receiver that detects electromagnetic energy within the water. The streamers 120 and the marine survey vessel 118 can include sensing electronics and data-processing facilities that allow marine survey receiver readings to be correlated with absolute positions on the sea surface and absolute three-dimensional positions with respect to a three-dimensional coordinate system. In FIG. 1, the marine survey receivers along the streamers are shown to lie below the sea surface 109, with the marine survey receiver positions correlated with overlying surface positions, such as a surface position 124 correlated with the position of marine survey receiver 122.

The marine survey vessel 118 can also tow one or more seismic sources 126 that produce signals as the marine survey vessel 118 and streamers 120 move across the sea surface 109. Seismic sources 126 and/or streamers 120 may also be towed by other vessels, or may be otherwise disposed in fluid volume 108. For example, marine survey receivers may be located on ocean bottom cables or nodes fixed at or near the surface 106, and seismic sources 126 may also be disposed in a nearly-fixed or fixed configuration. For the sake of efficiency, illustrations and descriptions herein show marine survey receivers located on streamers, but it should be understood that references to marine survey receivers located on a "streamer" or "cable" should be read to refer equally to marine survey receivers located on a towed streamer, an ocean bottom receiver cable, and/or an array of nodes. Although illustrated as a point, the seismic source 126 can represent a source string or a source array. The marine survey vessel 118 can include a controller 119. For example, the controller 119 can be coupled to the seismic source 126 and configured to control deployment and recovery of the seismic source 126 as described herein.

FIG. 1 shows source energy illustrated as an expanding, spherical signal, illustrated as semicircles of increasing radius centered at the seismic source 126, representing a down-going wavefield 128, following a signal emitted by the seismic source 126. The down-going wavefield 128 is, in effect, shown in a vertical plane cross section in FIG. 1. The outward and downward expanding down-going wavefield 128 may eventually reach the surface 106, at which point the outward and downward expanding down-going wavefield 128 may partially scatter, may partially reflect back toward the streamers 120, and may partially refract downward into the subsurface volume 104, becoming elastic signals within the subsurface volume 104.

Embodiments of the present disclosure are related to fiber optic sensor arrays and utilizing the fiber in an optical cable as a sensor fiber. An optical cable with sensors distributed along the length of the optical cable can be assembled using the fiber in the optical cable. For example, a sensor takeout (where the cable is opened to access the fiber and splice in components) spaced apart approximately every twenty meters along the optical cable can be used to assemble an optical cable that is five kilometers long with a total number of 250 sensor channels. Sensor spacing and the number of channels can be user selectable. Each optical cable can house a number of fiber optic lines, a small group of which can be used for the sensor and the remaining lines can be used for the optical telemetry lines to multiplex the sensors. The sensor can be assembled by extracting fibers from the optical cable to comprise the sensor. For example, a Michelson interferometer can be formed. An optical coupler can be coupled to the optical cable fiber at the first sensor takeout. At a second sensor takeout at a location ten meters away from the first sensor takeout in both directions, a mirror can be coupled to the optical cable to form the Michelson interferometer. The quantity of sensors and the length can vary with the specific application. Signal transmission to and from the optical sensors can be performed utilizing the remaining fibers in the optical cable. At least one embodiment of the present disclosure can be used in low-cost border or perimeter security applications.

A fiber optic sensor system may be used to measure an optical phase equivalent to acoustic pressure in a hydrophone. Some fiber optic sensors may include coils of fiber wrapped around mandrels, and the coils may be coupled to optical couplers to form an interferometer. In some fiber optic systems, the physical phenomenon being measured may be converted directly into differential optical phases by acting on the interferometer. For example, the acoustic waves may apply pressure to the arms of the interferometer and create an optical phase shift in the interferometer. Some other fiber optic systems may include fiber optic hydrophones in which two arms of the interferometer may be wound around two separate mandrels. One of the mandrels is placed inside the other mandrel in a concentric mandrel configuration. The air cavity between the two mandrels is used to enhance the sensitivity of the sensor. Some fiber optic systems may include push-pull configurations. Some fiber optic systems may rely on the acoustic pressure acting on the outside sensing mandrel to induce optical strain in the fiber, and epoxies and urethanes to make a seal between the mandrels. When the seals in some fiber optic systems fail, the air cavity may be flooded, and the acoustic sensitivity may decrease significantly.

Some fiber optic systems include fiber Bragg grating-based sensors. The fiber Bragg gratings may be used in different manners to measure a given phenomenon. In some fiber optic systems, the grating may be used as reflector, creating a Fabry-Perot interferometer where a change in phase of the light is measured. In some other fiber optic systems, the grating itself may be the sensor such that strain on the grating changes the period of the grating, which changes the wavelength of light reflected from the grating. This change in wavelength may be proportional to the strain on the grating.

While some approaches may describe optical sensor types and telemetry schemes, they do not describe array assembly or procedures for sensor packaging into a product of the present disclosure. Some approaches may use piezo-ceramic sensors in contrast to embodiments of the present disclosure.

Embodiments of the present disclosure address and overcome disadvantages of some fiber optic systems, such as the costly packaging, by providing a sensor system built directly into an optical cable. Extracting the fiber directly from the optical cable and using the fiber in the sensor assembly can reduce or eliminate the use of sensor mandrels and packaging materials that may add costs to fiber optic systems. When the optical cable is moved in any way, the fiber is strained, which shows up in the output of the interferometer as a phase change in the light as it propagates through the interferometer. Sensor lengths and sensor spacing can be varied independently based on user requirements. In at least one embodiment of the present disclosure, the optical (sensor) cable can be five kilometers long with a sensor every twenty meters (250 sensor channels). At least one embodiment of the present disclosure can include a longer optical cable with a less dense channel spacing as compared to the one sensor per twenty meters spacing or as compared to other approaches, or a shorter optical cable with a denser sensor spacing as compared to the one sensor per twenty meters spacing or as compared to other approaches. The optical multiplexing components can be packaged directly into the sensor housing. For example, three couplers can be packaged into the sensor housing.

At least one embodiment of the present disclosure can include assembling the sensor on the optical cable and bringing the entire group of sensors out to a point where a housing with the optical telemetry components can be packaged to collect the light from the sensors and multiplex the sensor onto an input and return optical fiber. Although such an embodiment may limit the number of channels based on how many fibers are in the optical cable, the sensor station can be easily assembled. Wavelength division multiplexing components can be added into the assembly to extend the length of the optical cable such that each section of the optical cable can be run by a different wavelength.

At least one embodiment relates to a fiber optic sensor system including an optical cable with sensor stations attached along the length of the optical cable. At least one embodiment of the present disclosure can include using the optical fibers in the optical cable as sensor fibers and optical telemetry fibers.

Figure 2:
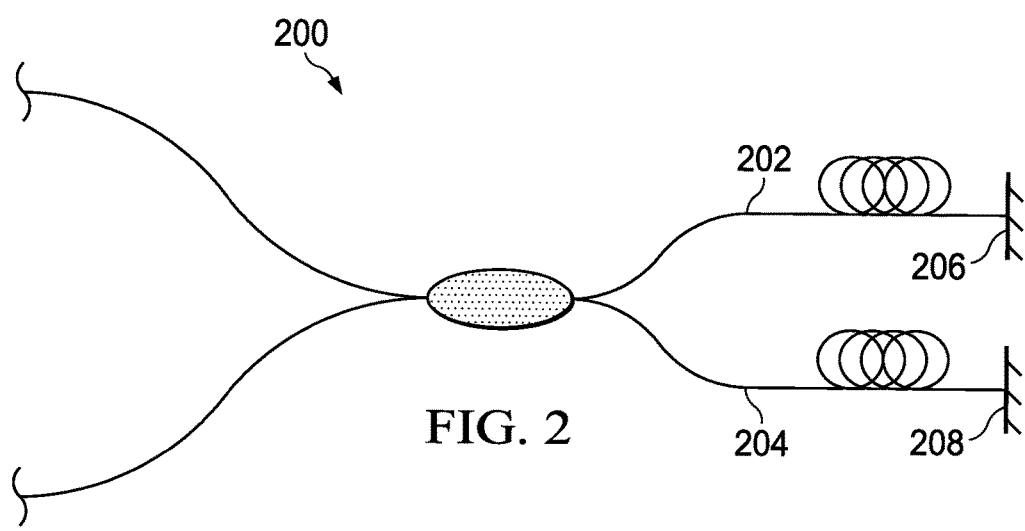
FIG. 2 shows an example Michelson interferometer.

FIG. 2 is an illustration of an optical interferometer 200 such as, a Michelson interferometer. Strain in the interferometer legs 202 and 204 create a phase shift in the light as it propagates through the interferometer 200. Mirrors 206 and 208 at the end of the interferometer segments 202 and 204 reflect the light back into the interferometer 200. That light is detected and demodulated to provide the output of the interferometer 200.

Figure 3:
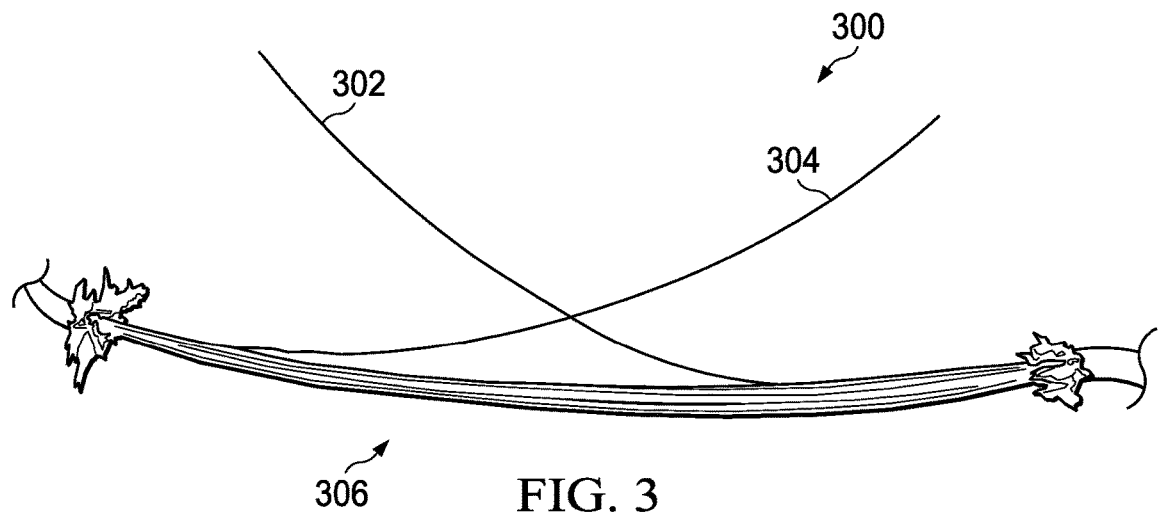
FIG. 3 shows optical fibers extracted from a first opening in an example telemetry cable for use in forming an optical sensor.

FIG. 3 is an illustration of a type of optical cable 300 that can be used in at least one embodiment of the present disclosure. The optical fibers 302 and 304 are extracted to provide the fibers to be used for forming a sensor assembly. FIG. 3 shows a first (main) sensor takeout 306 on the optical cable 300 that is used to form an optical interferometer. Two fibers 302 and 304 are extracted and spliced to an optical coupler (not shown) that comprises the optical interferometer. The fibers 302 and 304 remain in the optical cable 300 and are used to pick up the events being sensed. In at least one embodiment, the leads (portions of the optical fibers 302 and 304) in the optical cable 300 continue for approximately ten meters in both directions from the first sensor takeout 306 where the leads can be extracted again at a second sensor takeout, and mirrors can be coupled to form the optical interferometer.

Figure 4:
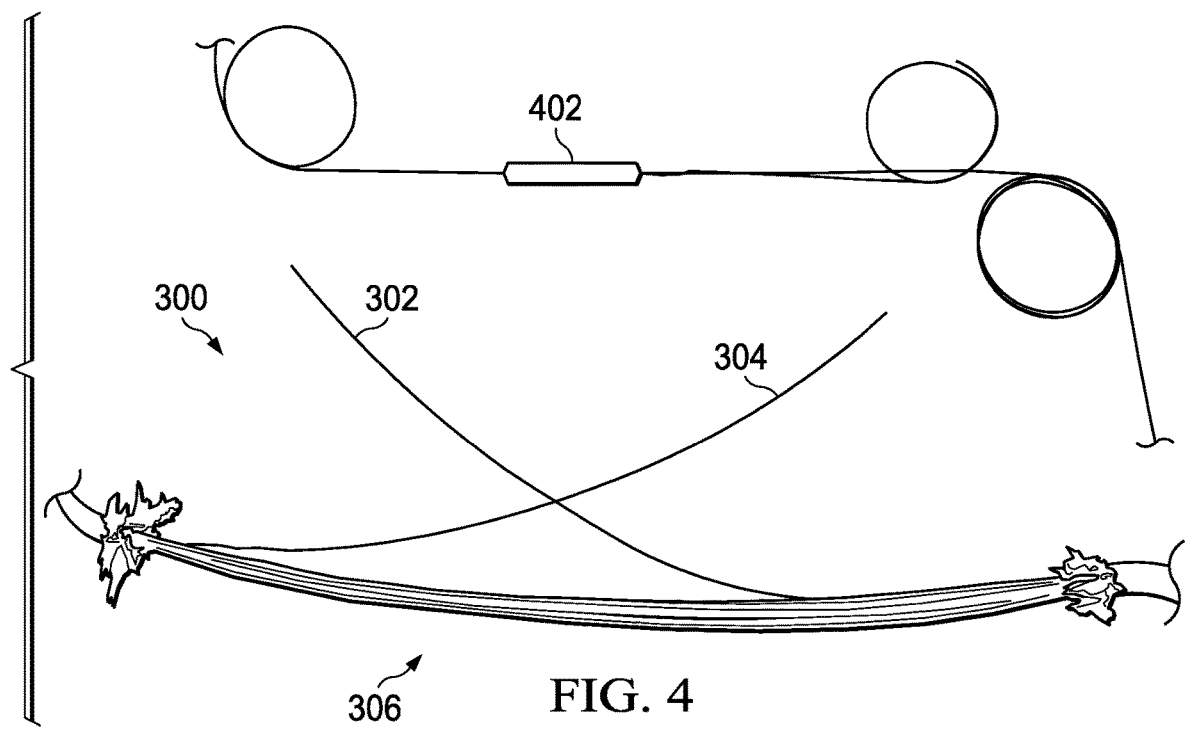
FIG. 4 shows the optical fibers of FIG. 3 in conjunction with an example optical coupler to be connected to the optical fibers to form the optical sensor.

FIG. 4 shows an optical coupler 402 to be coupled to the two extracted fibers 302 and 304 shown in FIG. 3 to form the interferometer arms of the optical sensor. FIG. 4 shows the optical cable 300 shown in FIG. 3 with an optical coupler 402 that is to be coupled to the leads. The leads may be attached using an optical fusion splicer. After the optical interferometer is formed, optical telemetry components (e.g., couplers for coupling the optical interferometer to telemetry fibers) are attached to the sensor and the telemetry fibers of the optical cable 300. The telemetry components deliver the optical signal to and from the optical sensor, deliver light further down the optical cable, and collect the light from sensors that are further down the optical cable 300.

Figure 5:
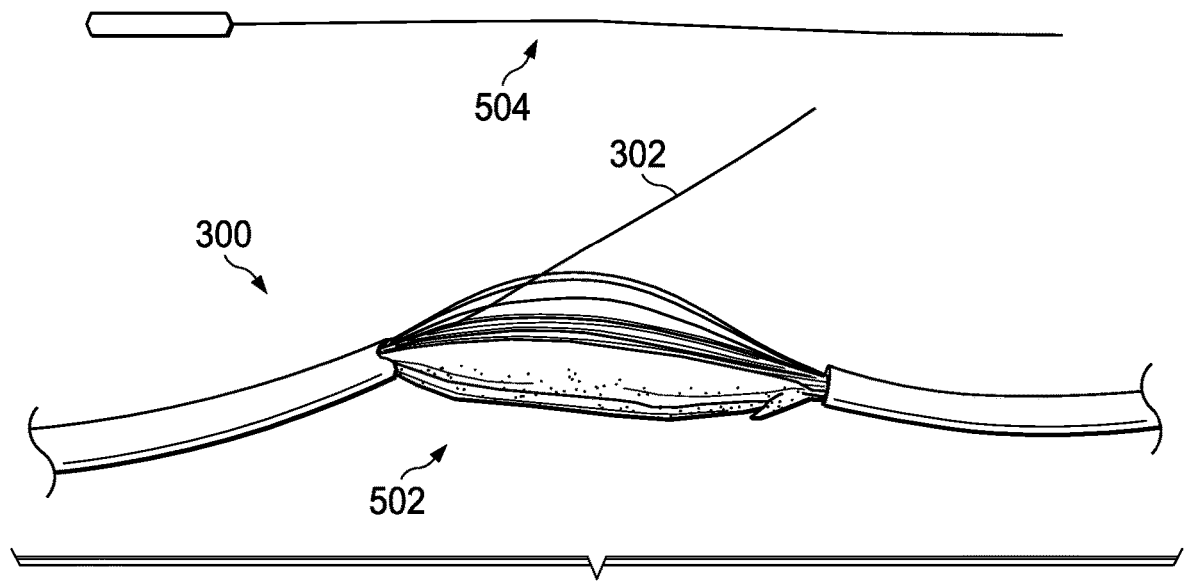
FIG. 5 shows a second opening in the telemetry cable of FIG. 3, at which an example mirror is coupled to one of the optical fibers of FIG. 3.

FIG. 5 is an illustration of the second sensor takeout 502, described in association with FIG. 4 above, that can be used to connect the mirror 504 to the fiber 302. The second sensor takeout 502 for coupling the mirror 504 to the fiber 302 can be smaller than the first sensor takeout 306 for coupling the optical coupler 402 to the fiber 302. In at least one embodiment, after the optical coupler 402 illustrated in FIG. 4 is attached, the fiber 302 can be extracted at the second sensor takeout 502, ten meters away from the first sensor takeout 306, to couple the mirror 504, set the interferometer optical path length, and splice the mirror 504 to the optical cable 300.

Figure 6:
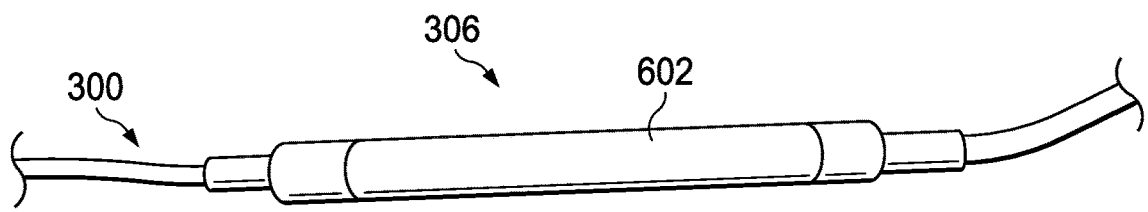
FIG. 6 shows an example housing disposed about the first opening in the telemetry cable.

FIG. 6 is an illustration of housing 602 that can be used to encase the optical telemetry and sensor couplers at the first sensor takeout 306. These components can be housed in this assembly to protect the components and loose fiber.

Figure 7:
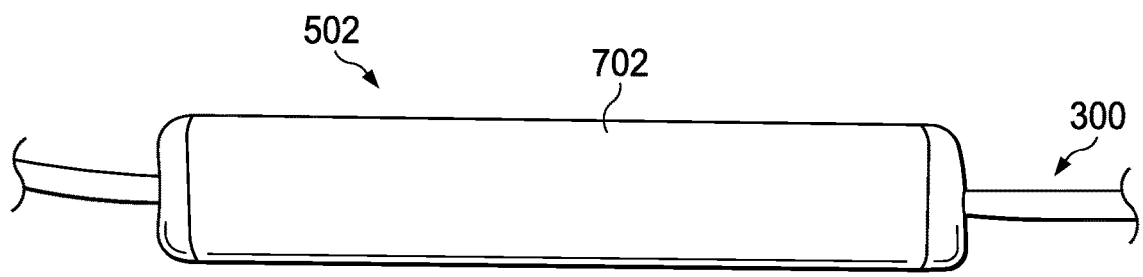
FIG. 7 shows an example housing disposed about the second opening in the telemetry cable.

FIG. 7 is an illustration of packaging or housing 702 that can be used to house the mirror 504 and a splice that forms the interferometer. The housing 702 of the mirror 504 and the splice that forms the interferometer can be smaller than the housing 602 of the optical telemetry and sensor couplers.

Figure 8:
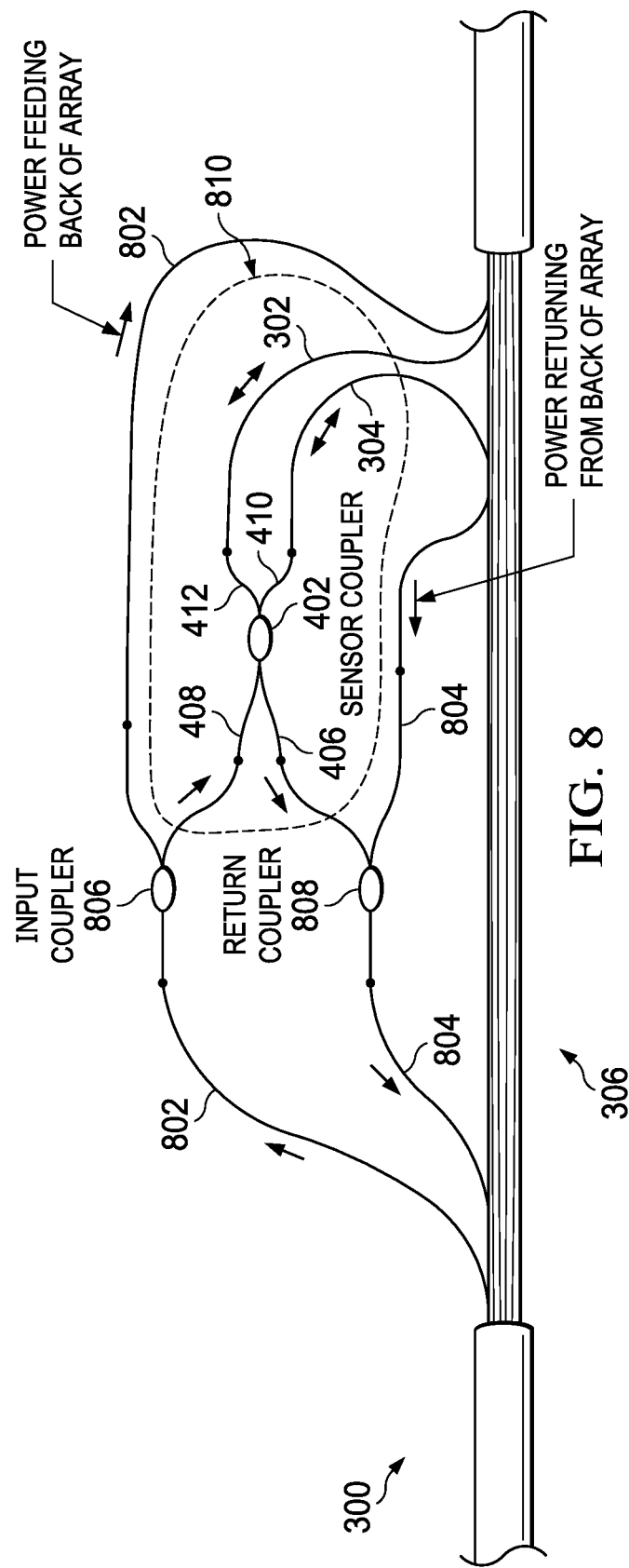
FIG. 8 shows a diagram of an example optical sensor formed at the first opening of the telemetry cable.

FIG. 8 is an illustration of the optical cable 300 showing example sensor and telemetry components at the first sensor takeout 306 that may be packaged into the housing 602. FIG. 8 shows an optical sensor 810 coupled to a first telemetry fiber 802 and a second telemetry fiber 804. The first telemetry fiber 802 conducts light energy from a light source of a seismic data acquisition system to the optical sensor 810 and to optical sensors downstream from the optical sensor 810. The second telemetry fiber 804 conducts light energy from the from the optical sensor 810, and optical sensors downstream from the optical sensor 810 to optical receiver circuitry of the seismic data acquisition system. The first optical telemetry fiber 802 is coupled to the optical sensor 810 via the input coupler 806. The second optical telemetry fiber 804 is coupled to the optical sensor 810 via the return coupler 808.

The sensor 810 includes the optical coupler 402. A first segment 406 of optical fiber connects the optical coupler 402 to the return coupler 808 for return of optical signal to the optical receiver circuitry. A second segment 408 of optical fiber connects the optical coupler 402 to the input coupler 806 for provision of optical signal to the optical coupler 402. A third segment 410 of optical fiber connects the optical coupler 402 to the optical fiber 304. A first instance of the mirror 504 is coupled to the optical fiber 304 at a first instance of the second sensor takeout 502. A fourth segment 412 of optical fiber connects the optical coupler 402 to the optical fiber 302. A second instance of the mirror 504 is coupled to the optical fiber 302 at a second instance of the second sensor takeout 502.

Although some embodiments of the present disclosure described herein include a Michelson interferometer, embodiments of the present disclosure are not so limited. For example, the optical sensor 810 sensor can be manufactured using a Fabre Perot type, an in-line Michleson approach, or a Mach Zehnder interferometer. At least one embodiment of the present disclosure can include using a multiplexing scheme to harvest the light from the interferometer. Although some embodiments of the present disclosure described herein include frequency division multiplexing (FDM) schemes, and FDM and wavelength division multiplexing (WDM) schemes, embodiments of the present disclosure can use other telemetry options such as Time Division Multiplexing (TDM) variants.

Figure 9:
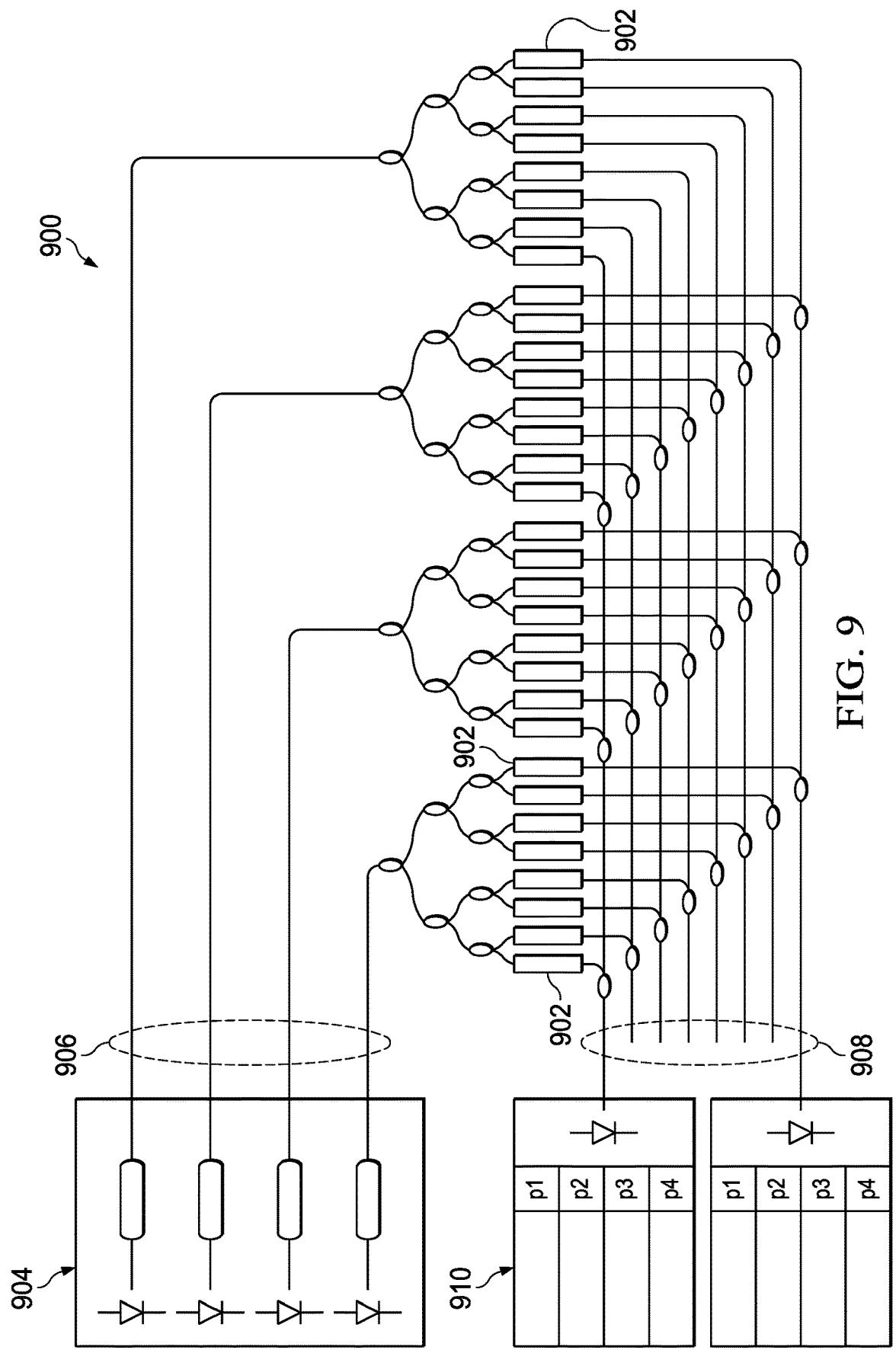
FIG. 9 shows an example seismic data acquisition system including an optical cable with optical sensors formed therein used with frequency division multiplexing.

FIG. 9 is an illustration of an exemplary FDM telemetry system 900 that can be used in at least one embodiment of the present disclosure. Modulated laser light generated by light source 904 can be launched into the optical cable to deliver light to and from the optical sensors 902. The optical sensors 902 (each represented by a rectangle in the middle of FIG. 9) are implementations of the optical sensor 810 or similar sensor formed at sensor takeouts 306 and 502 as described herein. Using different carrier frequencies for the modulation can allow for multiple sensors to return to an optical receiver 910 on a single fiber. While FIG. 9 shows four input frequencies 906 and eight returns 908, at least one embodiment of the present disclosure can include twelve inputs and twelve returns to provide 144 sensors. Embodiments of the present disclosure can include any combination of input and return fibers.

Figure 10:
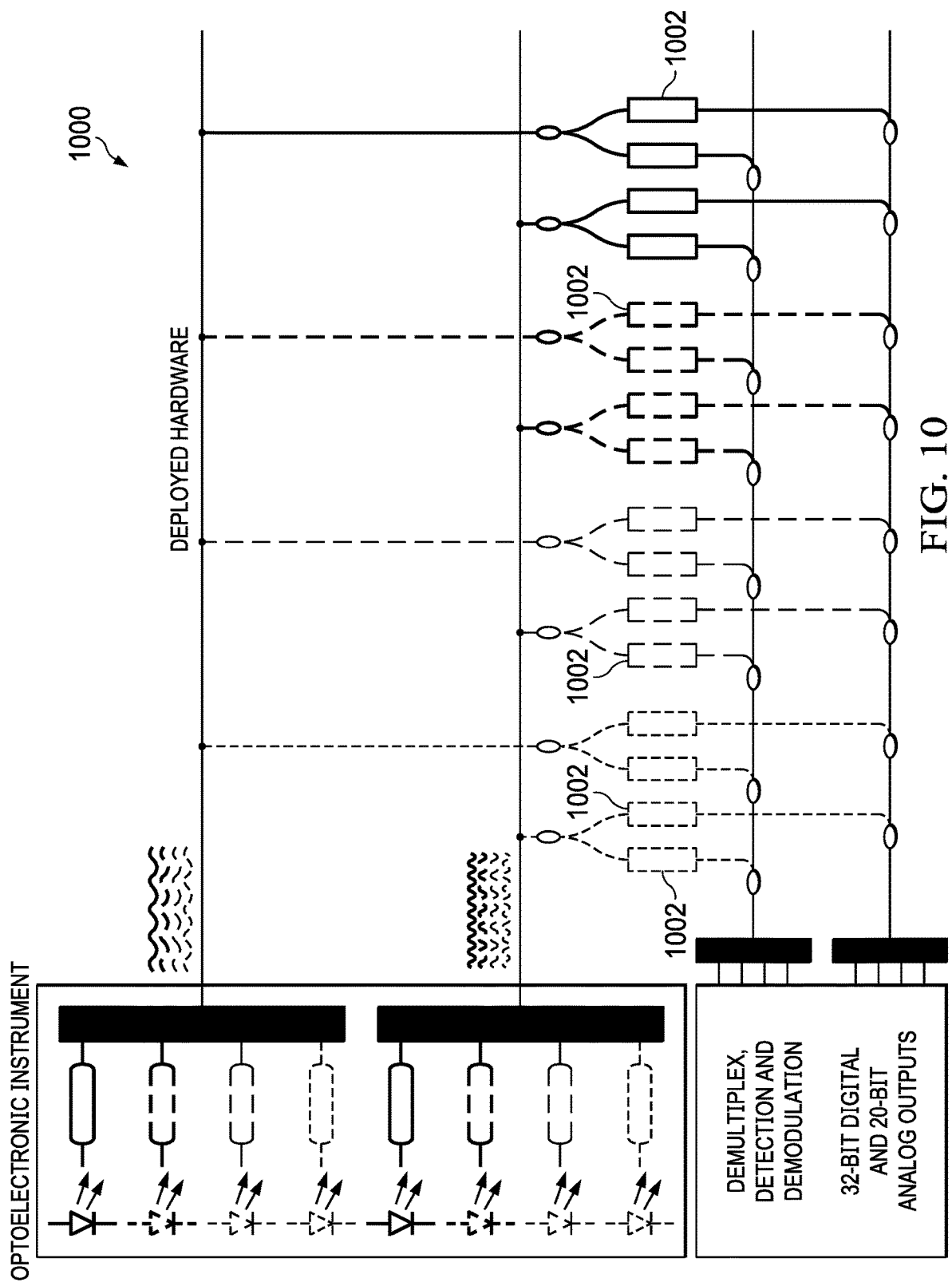
FIG. 10 shows an example seismic data acquisition system including an optical cable with optical sensors formed therein used with frequency division multiplexing and wavelength division multiplexing.

FIG. 10 is an illustration of an FDM and WDM telemetry system 1000 that can be used in at least one embodiment of the present disclosure to deliver light to and from the optical sensors 1002. The optical sensors 1002 (each represented by a rectangle in the middle of FIG. 10) are implementations of the optical sensor 810 or similar sensor formed at takeouts 306 and 502 as described herein. The addition of a WDM telemetry scheme to the FDM telemetry scheme can expand the lengths of the optical cable. Each additional wavelength adds another complete FDM layer but at a different wavelength. In the 12×12 configuration described with respect to FIG. 9 that provides 144 channels, if ten different wavelengths are added then 1,440 channels can be provided, which provides 120 channels per return fiber.

Figure 11:
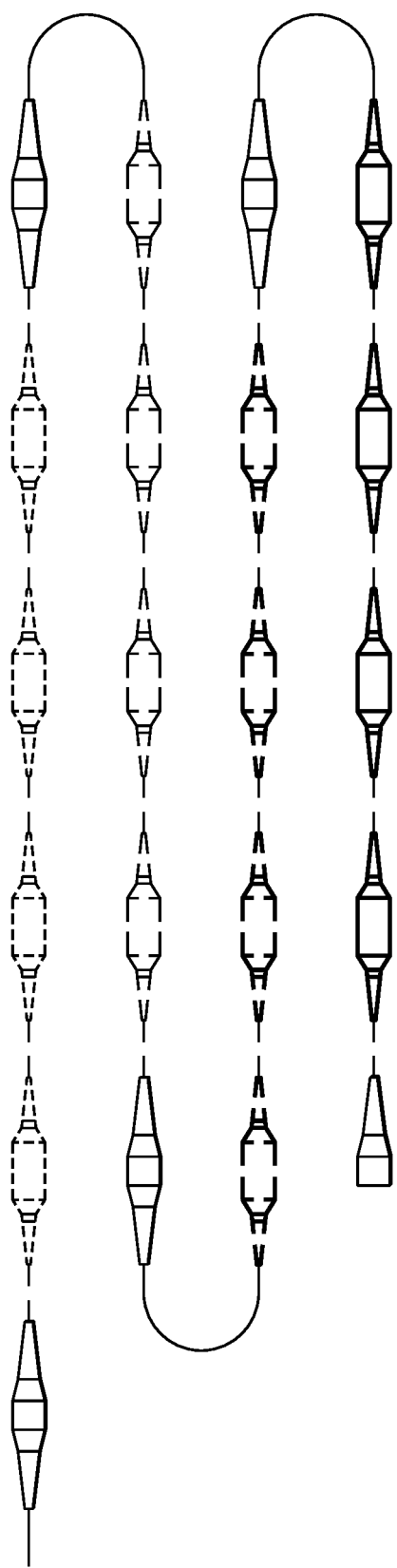
FIG. 11 shows an example of use of frequency division multiplexing and wavelength division multiplexing with a telemetry cable having optical sensors formed therein.

FIG. 11 is an illustration of how the FDM/WDM telemetry scheme described in association with FIG. 10 above can be used in the assembly of a completed optical cable. The wavelength drop can be placed at the head end of the section and then run through the complete FDM layer, then onto the next section where the second wavelength is dropped.

Figure 12:
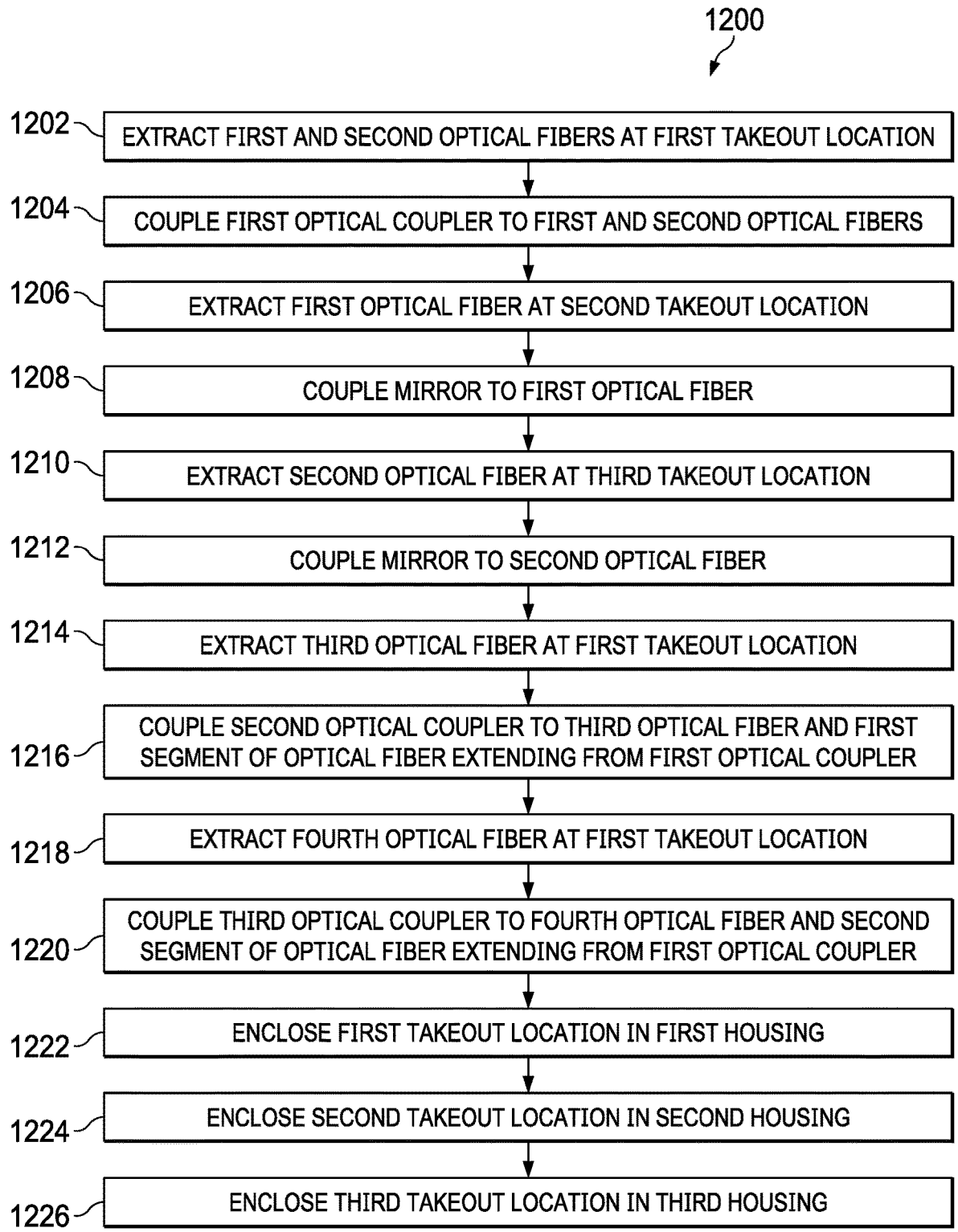
FIG. 12 shows a flow diagram for a method for providing an optical sensor using the optical fibers of an optical cable.

FIG. 12 shows a flow diagram for a method 1200 for providing an optical sensor using the optical fibers of an optical cable. Though depicted sequentially as a matter of convenience, at least some of the actions shown can be performed in a different order and/or performed in parallel. Additionally, some implementations may perform only some of the actions shown.

In block 1202, the first optical fiber 302 and a second optical fiber 302 are extracted from the optical cable 300 at a first sensor takeout location 306. For example, jacketing of the cable 300 is removed at the first sensor takeout location 306, the first optical fiber 302 and the second optical fiber 304 are selected from the plurality of optical fibers provided in the optical cable 300. The first optical fiber 302 and the second optical fiber 304 may be cleaved in preparation for fusion splicing.

In block 1204, the first optical fiber 302 and the second optical fiber 304 are coupled to a first optical coupler. For example, the first optical fiber 302 is fusion spliced to a first segment of optical fiber extending from the first optical coupler, and the second optical fiber 304 is fusion spliced to a second segment of optical fiber extending from the first optical coupler.

In block 1206, the first optical fiber 302 is extracted from the optical cable 300 at a second sensor takeout location 502. The second sensor takeout location 502 is longitudinally offset (e.g., in a first direction) from the first sensor takeout location 306. The first optical fiber 302 may be cleaved in preparation for fusion splicing.

In block 1208, the first optical fiber 302 is coupled to a mirror 504 at the second sensor takeout location 502. For example, the first optical fiber 302 is fusion spliced to the mirror 504 at the second sensor takeout location 502.

In block 1210, the second optical fiber 304 is extracted from the optical cable 300 at a second sensor takeout location 502. The second sensor takeout location 502 is longitudinally offset (e.g., in a second direction) from the first sensor takeout location 306. The second optical fiber 304 may be cleaved in preparation for fusion splicing.

In block 1212, the second optical fiber 304 is coupled to a mirror 504 at the second sensor takeout location 502. For example, the first optical fiber 304 is fusion spliced to the mirror 504 at the second sensor takeout location 502.

In block 1214, a third optical fiber 802 is extracted from the optical cable 300 at the first sensor takeout location 306. The third optical fiber 802 is a telemetry fiber that transfers light energy from a light source to the optical sensor formed from the first optical fiber 302 and the second optical fiber 304.

In block 1216, a second optical coupler 806 couples the third optical fiber 802 to a segment of optical fiber 408 extending from the optical coupler 402 to connect the optical sensor to a light source.

In block 1218, a fourth optical fiber 804 is extracted from the optical cable 300 at the first sensor takeout location 306. The fourth optical fiber 804 is a telemetry fiber that transfers light energy from the optical sensor formed from the first optical fiber 302 and the second optical fiber 304 to an optical receiver.

In block 1220, a third optical coupler 808 couples the fourth optical fiber 804 to a segment of optical fiber 406 extending from the optical coupler 402 to connect the optical sensor to the optical receiver.

In block 1222, a first housing 602 encloses the first sensor takeout location 306.

In block 1224, a second housing 702 encloses the second sensor takeout location 502 where the first optical fiber 302 is coupled to the mirror 504.

In block 1226, a third housing 702 encloses the second sensor takeout location 502 where the second optical fiber 304 is coupled to the mirror 504.

The method 1200 may be repeated to provide any number of optical sensors 810 in the sensor cable 300.

Figure 13:
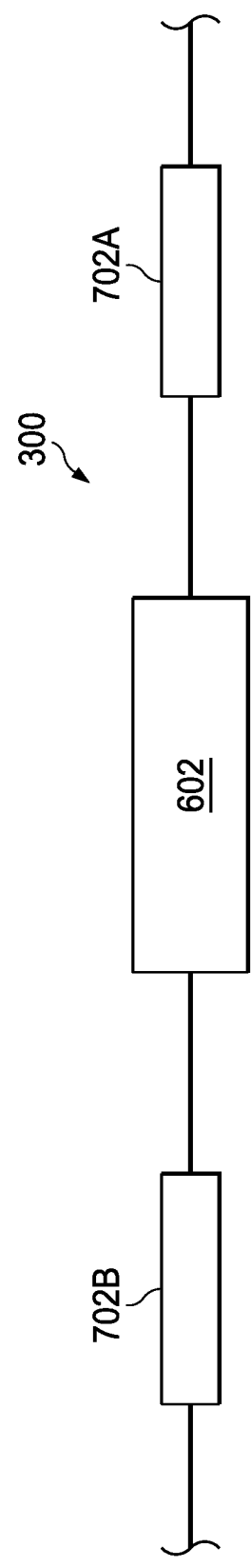
FIG. 13 shows an example optical cable that includes an optical sensor in accordance with the present disclosure.

FIG. 13 shows an example optical cable 300 that includes an optical sensor in accordance with the present disclosure. The optical cable 802 includes a housing 602 that encloses the optical sensor 810, the input coupler 806, the return coupler 808, the optical fiber 802, the optical fiber 804, etc. Longitudinally offset (in a first direction) from the housing 602, the optical cable 300 includes a housing 702A (an instance of the housing 702) that encloses a mirror 504 and the optical fiber 302. Longitudinally offset (in a second direction) from the housing 602, the optical cable 300 includes a housing 702B (an instance of the housing 702) that encloses a mirror 504 and the optical fiber 304. The optical cable 300 may include any number of sensors each comprising an instance of the housing 602, the housing 702A, and the housing 702B enclosing the optical components described herein.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

What is claimed is:

1. A fiber optic cable, comprising:
   a plurality of optical fibers;
   a jacket surrounding the optical fibers;
   an optical sensor comprising:
      a first optical coupler coupled to a first of the optical fibers and a second of the optical fibers at a first sensor takeout location, wherein the first sensor takeout location comprises a first opening in the jacket of the fiber optic cable at a first site from which a first portion of the jacket is removed; and
      a first mirror coupled to the first of the optical fibers at a second sensor takeout location, wherein the second sensor takeout location comprises a second opening in the jacket of the fiber optic cable at a second site from which a second portion of the jacket is removed; and
   wherein the first sensor takeout location is longitudinally offset from the second sensor takeout location.

2. The fiber optic cable of claim 1, wherein:
   the optical sensor comprises a second mirror coupled to the second of the optical fibers at a third sensor takeout location;
   wherein the third sensor takeout location is longitudinally offset from the first sensor takeout location and the second sensor takeout location.

3. The fiber optic cable of claim 1, wherein the optical sensor comprises a second mirror coupled to the second of the optical fibers at the second sensor takeout location.

4. The fiber optic cable of claim 1, further comprising a second optical coupler, at the first sensor takeout location, coupled to a third of the optical fibers and to a first segment of optical fiber extending from the first optical coupler.

5. The fiber optic cable of claim 1, further comprising a third optical coupler, at the first sensor takeout location, coupled to a fourth of the optical fibers and to a second segment of optical fiber extending from the first optical coupler.

6. The fiber optic cable of claim 1, further comprising a first housing enclosing the first sensor takeout location and a second housing enclosing the second sensor takeout location.

7. The fiber optic cable of claim 1, wherein the optical sensor is a Michelson interferometer or a Fabre Perot interferometer.

8. The fiber optic cable of claim 7, wherein the Fabre Perot interferometer comprises optical grating components.

9. The fiber optic cable of claim 7, wherein the Michelson interferometer comprises an in-line Michelson architecture.

10. A seismic data acquisition system, comprising:
a fiber optic cable, comprising:
   a plurality of optical fibers;
   a jacket surrounding the optical fibers;
   an optical sensor comprising:
      a first optical coupler coupled to a first of the optical fibers and a second of the optical fibers at a first sensor takeout location, wherein the first sensor takeout location comprises a first opening in the jacket of the fiber optic cable at a first site from which a first portion of the jacket is removed;
      a first mirror coupled to the first of the optical fibers at a second sensor takeout location, wherein the second sensor takeout location comprises a second opening in the jacket of the fiber optic cable at a second site from which a first portion of the jacket is removed;
      a second mirror coupled to the second of the optical fibers at a third sensor takeout location, wherein the third sensor takeout location comprises a third opening in the jacket of the fiber optic cable at a third site from which a third portion of the jacket is removed;
      a second optical coupler coupled to a third of the optical fibers and to a first segment of optical fiber extending from the first optical coupler;
      a third optical coupler coupled to a fourth of the optical fibers and to a second segment of optical fiber extending from the first optical coupler;
      a first housing enclosing the first sensor takeout location;
      a second housing enclosing the second sensor takeout location; and
      a third housing enclosing the third sensor takeout location.

11. The seismic data acquisition system of claim 10, wherein the optical sensor is a Michelson interferometer or a Fabre Perot interferometer.

12. The seismic data acquisition system of claim 11, wherein the Fabre Perot interferometer comprises optical grating components.

13. The seismic data acquisition system of claim 11, wherein the Michelson interferometer comprises an in-line Michelson architecture.

14. The seismic data acquisition system of claim 10, further comprising a light source coupled to the fiber optic cable and configured to multiplex an output of the optical sensor using Frequency Division Multiplexing (FDM) telemetry.

15. The seismic data acquisition system of claim 10, further comprising a light source coupled to the fiber optic cable and configured to multiplex an output of the optical sensor using FDM and Wavelength Division Multiplexing (WDM) telemetry.

* * * * *